US009276308B2

(12) United States Patent
Meinel

(10) Patent No.: US 9,276,308 B2

(45) Date of Patent: Mar. 1, 2016

(54) ARRANGEMENT FOR MOUNTING AND ADJUSTING A SENSOR

(71) Applicant: Bayerische Motoren Werke Aktiengesellschaft, Munich (DE)

(72) Inventor: Rocco Meinel, Klingenthal (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/480,074

(22) Filed: Sep. 8, 2014

(65) Prior Publication Data

US 2015/0069193 A1 Mar. 12, 2015

(30) Foreign Application Priority Data

Sep. 9, 2013 (DE) ........................ 10 2013 217 939

(51) Int. Cl.

*F16M 11/14* (2006.01)
*H01Q 1/32* (2006.01)
*H01Q 3/04* (2006.01)

(52) U.S. Cl.

CPC ............... *H01Q 1/3233* (2013.01); *H01Q 3/04* (2013.01)

(58) Field of Classification Search

CPC ..... G01S 7/02; G01S 13/1931; G01S 7/4026; H01Q 1/3233; H01G 3/04

See application file for complete search history.

(56) References Cited

U.S. PATENT DOCUMENTS

| | | | | |
|---|---|---|---|---|
| 5,258,894 | A * | 11/1993 | Bivens | 362/528 |
| 5,743,618 | A * | 4/1998 | Fujino et al. | 362/528 |
| 6,322,275 | B1 | 11/2001 | Schmidt et al. | |
| 7,243,885 | B2 | 7/2007 | Zeiher et al. | |

FOREIGN PATENT DOCUMENTS

| | | | |
|---|---|---|---|
| DE | 10 2004 046 559 | A1 | 4/2006 |
| EP | 0 937 311 | B1 | 12/2001 |
| EP | 1 444 114 | B1 | 6/2007 |

OTHER PUBLICATIONS

German Search Report dated Feb. 28, 2014, with English translation (Ten (10) pages).

* cited by examiner

*Primary Examiner* — Amy Sterling

(74) *Attorney, Agent, or Firm* — Crowell & Moring LLP

(57) ABSTRACT

An arrangement is provided for mounting and adjusting a sensor, particularly a radar distance sensor, on a motor vehicle. The sensor is accommodated in a sensor housing. The sensor housing is fastened on a holder so as to be tiltable about a degree of freedom. The holder is fastened to the motor vehicle. The sensor housing includes receiving devices in a first lateral edge area and an opposite, second, lateral edge area, in which fastening domes are in each case arranged. The sensor housing is fixed in the first lateral edge area by way of at least two fastening domes and fasteners engaging therein on the holder. The sensor housing is tiltably fixed with respect to the holder in the second lateral edge area by way of at least one fastening dome and a threaded bolt engaging in this fastening dome and the holder.

9 Claims, 2 Drawing Sheets

ARRANGEMENT FOR MOUNTING AND ADJUSTING A SENSOR

CROSS REFERENCE TO RELATED APPLICATIONS

This application claims priority under 35 U.S.C. §119 from German Patent Application No. 10 2013 217 939.1, filed Sep. 9, 2013, the entire disclosure of which is herein expressly incorporated by reference.

BACKGROUND AND SUMMARY OF THE INVENTION

The invention relates to an arrangement for mounting and adjusting a sensor, particularly a distance radar sensor, on a motor vehicle, the sensor being accommodated in a sensor housing which is tiltably fastened with a degree of freedom on a holder to be fastened to the motor vehicle.

Arrangements of the above-mentioned type for fastening such a sensor are known, for example, from German Patent Document DE 10 2004 046 559 A1, European Patent Document EP 1 444 114 B1 or European Patent Document EP 0 937 311 B1. In the case of holding arrangements according to the state of the art, the sensor housing is either fastened by use of at least three screws to a holder and adjusted, or an adjusting screw is rotatably and tiltably held in a torsion-proof manner at the mounting point in a fixing dome. In the case of the systems known from the state of the art, although the adjusting of the sensor housing can take place by way of a plurality of adjusting devices, this also involves the risk of an adjusting of the alignment of the sensor housing with respect to the holder at several adjusting possibilities. A radar distance sensor can basically predominantly be adjusted in the vertical direction; a horizontal alignment plays a subordinate role and can be omitted.

Based on this background, it is an object of the invention to provide a simplified arrangement for mounting and adjusting a sensor on a motor vehicle, by which a vertical alignment of the sensor becomes possible using a single adjusting device.

This and other objects are achieved by an arrangement for mounting and adjusting a sensor, particularly a radar sensor, on a motor vehicle. The sensor is accommodated in a sensor housing, which is fastened in a tiltable manner with a degree of freedom on a holder to be fastened on the motor vehicle. The sensor housing has receiving devices or seats in a first lateral edge area and an opposing second lateral edge area, in which fastening domes are, in each case, arranged. The sensor housing is fixed in the first lateral edge area by way of at least two fastening domes and fasteners engaging therein, rotatably about an axis, on the holder. The sensor housing is tiltably fixed with respect to the holder in the second lateral edge area by way of a fastening dome and a single threaded bolt engaging in the fastening dome and the holder.

The sensor housing can be moved with respect to the holder in only one degree of freedom, so that only a vertical tilting of the sensor housing becomes possible. The pivotal point or the axis of rotation of the sensor housing with respect to the holder is situated in the two fastening domes arranged in the first lateral edge area, fasteners devices engaging into the fastening domes.

In an advantageous embodiment, the fastening domes reach around receiving spaces in which correspondingly complementarily designed sections of the fastening devices can engage, so that a rotation can be achieved.

In a further advantageous embodiment, the fasteners are ball clips having a ball end (head), which fits into the correspondingly spherical receiving space of the corresponding fastening dome. The ball clips are snapped or clipped with their respective ball ends through the holder into the respective pertaining fastening dome. The ball clips therefore fasten the sensor housing to the holder by way of the fastening domes arranged therein, but simultaneously permit a rotation or tilting of the sensor housing with respect to the holder along an axis of rotation formed by the ball centers of the ball ends of the ball clips.

The continuous adjusting of the tilted position of the sensor housing with respect to the holder takes place exclusively by way of a single threaded bolt. The threaded bolt engages in a third fastening dome arranged in the second lateral edge area of the sensor housing and engages with the holder at a corresponding pertaining point. This is done in order to define the variable distance of the sensor housing from the holder in the second lateral edge area with respect to the defined distance of the sensor housing from the holder in the first lateral edge area, and thereby coordinate the tilted position of the sensor housing with respect to the holder. In this case, it is advantageous for the fastening dome inserted into the sensor housing in the second lateral edge area to have an open design toward the front, so that an adjusting tool can be guided through the fastening dome to the threaded bolt. As a result of the rotation of the threaded bolt, the tilted position of the sensor housing can be adapted with respect to the holder.

In an advantageous embodiment, the threaded bolt is constructed as a spherical threaded bolt and engages with its spherical section in the pertaining fastening dome, which has a complementary receiving device, in order to be rotatably fixed therein. The threaded bolt extends through an opening in the holder, in which an insert nut is arranged which fixes the threaded bolt in its position at the holder. As an alternative, it may be provided in a simplified embodiment to make available a thread, which correspondingly matches the threaded bolt, directly in the opening of the holder.

In an advantageous embodiment of the invention, it is further provided that the fastening domes have slots. These extend along the holding area, which rests against the sensor housing, as well as along the area which is inserted into the receiving devices of the sensor housing.

According to an advantageous embodiment, the ball clips are also slotted, in which case, a holding area extending along the holder also has slots, and these extend in an area that is inserted through the holder into the fastening domes. The slots have the advantageous effect that the fastening domes have a certain elasticity in the area of their receiving spaces. As a result, when the sensor housing is rotated with respect to the holder, no deformations will occur in the area of the fastening points at the connection between the ball clips and the fastening domes.

The advantageous material for the fastening domes as well as the ball clips is plastic material; the spherical threaded bolt is preferably constructed of metal.

Other objects, advantages and novel features of the present invention will become apparent from the following detailed description of one or more preferred embodiments when considered in conjunction with the accompanying drawings.

DETAILED DESCRIPTION OF THE DRAWIN

The figures are schematic examples, in which the GS same reference numbers indicate identical parts.

Figure 1:
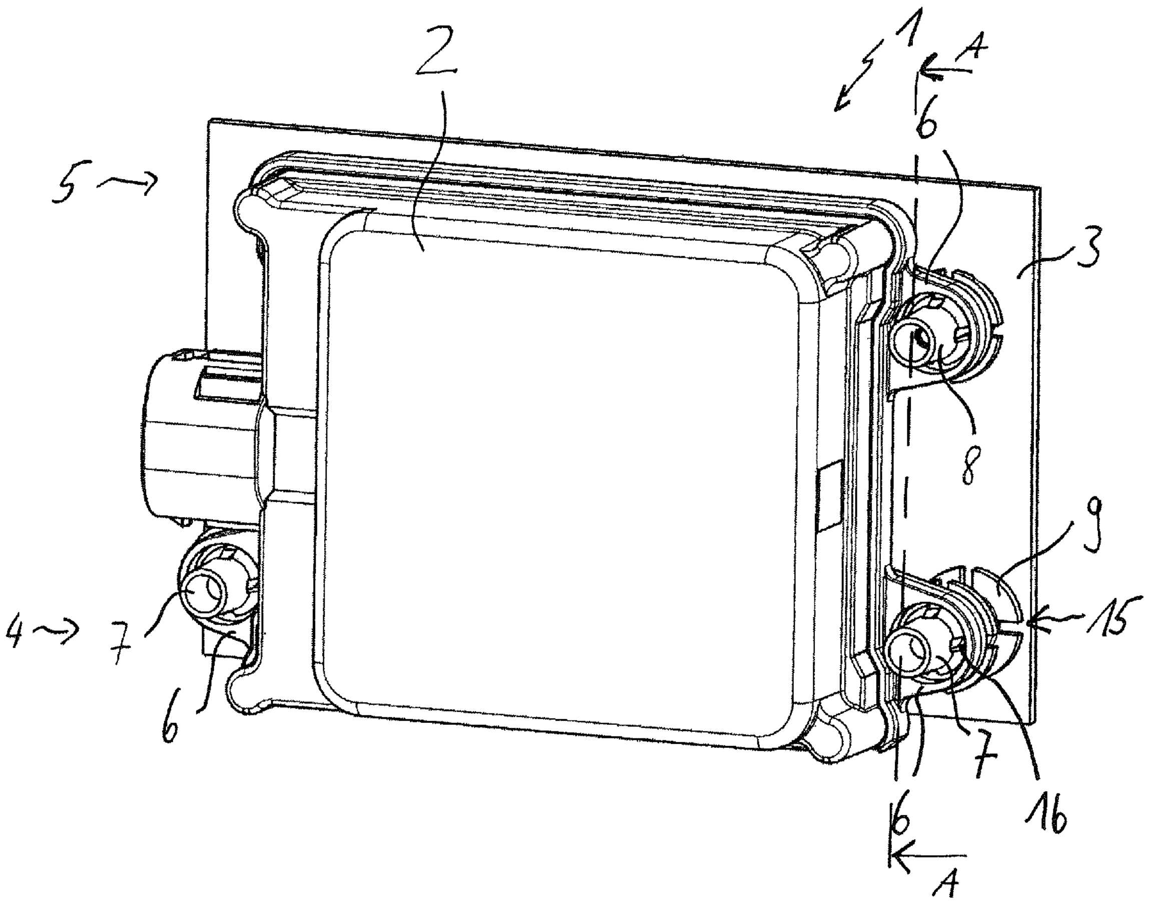
FIG. 1 is a perspective view of an embodiment of the arrangement for mounting and adjusting the sensor according to the invention.

The embodiment of the invention of FIG. 1 illustrates an arrangement 1 for mounting and adjusting a sensor (not shown) on a motor vehicle. The sensor is received in the sensor housing 2 and is adjusted with the sensor housing 2 with respect to the holder 3 to be fastened at the motor vehicle. A first lateral edge area 4 of the sensor housing 2 is disposed on the holder 3 in a fixed but rotatable manner, and a second lateral edge area 5 of the sensor housing 2 can be fastened and adjusted, respectively, with respect to the holder in regard to its distance in a variable manner.

The sensor housing 2 has two spaced receiving devices (seats) 6 in the first lateral edge area 4, which receiving devices 6 are each designed for receiving a fastening dome 7. The opposite second lateral edge area 5 of the sensor housing 2 has a single receiving device 6 which receives a third fastening dome 8.

Viewed in the circumferential direction, the fastening domes 7, 8 as well as the ball clips 9 have several slots 16, 15, which result in an increased elasticity of the entire arrangement 1.

Figure 2:
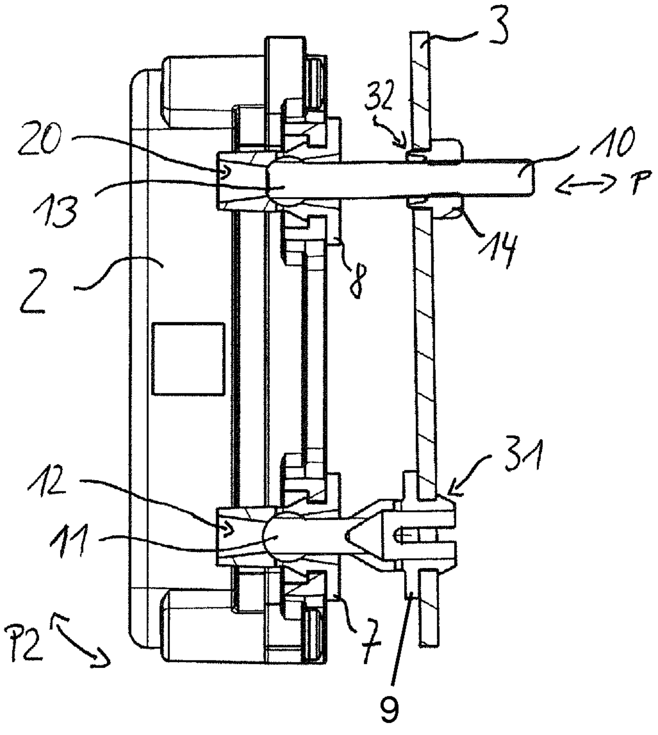
FIG. 2 is a lateral sectional view of the arrangement of FIG. 1.

FIG. 2 is a sectional view taken along line A-A of the arrangement 1 of FIG. 1. In the holder 3, ball clips 9 are fastened to corresponding passages 31. The ball clips 9 have a protruding section, which is designed as a ball end (head) 11 and is accommodated in a fixed manner in a complementary section 12 of the associated fastening dome 7. The ball end 11 and the receiving device (socket) 12 permit a fastening of the sensor housing 2 indirectly at the holder 3. The sensor housing 2 can simultaneously be tilted or rotated with respect to the holder 3 because the receiving device 12 of the fastening dome 7 permits a relative movement of the respective ball end 11 about the axis of rotation. The connection of the ball clips 9 to the receiving devices 6 illustrated in FIG. 1 in the first lateral edge area 4, however, is identical on each lateral side.

In the second lateral edge area 5 of the sensor housing 2, the head 13 of a spherical threaded bolt 10 is rotatably accommodated in the fastening dome 8 in a fixed manner. The fastening dome 8 has an opening 20 toward its front, by way of which a rotation of the spherical threaded bolt 10 is made possible by means of a corresponding tool (such as a screw driver). The holder 3 has a passage 32, through which the spherical threaded bolt 10 extends, and to which the latter is fastened via an insert nut 14 by way of a thread. As a result of the rotation of the spherical threaded bolt 10, the latter moves in the direction of the arrow P and generates a movement of the second lateral edge area 5 of the sensor housing 2 relative to the holder 3. Thus, the sensor housing 2 moves and tilts in the direction of the arrow P2. The ball ends 11 of the ball clips 9, as well as the head 13 of the spherical threaded bolt 10, are clipped into the respectively associated fastening domes 7, 8. The fastening domes 7, 8 are also clipped into the respective receiving devices 6 of the sensor housing 2.

In its implementation, the invention is not limited to the above-mentioned preferred embodiments. On the contrary, a number of variants are conceivable which use the illustrated solution also in cases of principally different types of designs. For example, instead of ball clips and spherical receiving areas (ball and socket connections) in the fastening domes, different shapes known from the state of the art can also be selected, which allow a rotatable fixing accommodation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustable mounting arrangement for a sensor on a motor vehicle, comprising:

- a sensor housing for accommodating the sensor, the sensor housing having receiving devices, wherein said receiving devices are arranged in a first lateral edge area and an opposite, second, lateral edge area of the sensor housing;
- fastening domes, one fastening dome being arranged in each of the receiving devices;
- a holder fastenable to the motor vehicle,
- wherein
  - the sensor housing is fixed in the first lateral edge area on the holder via two fastening domes and axially-fixed fasteners engaging therein so as to be rotatable about an axis,
  - the sensor housing is tiltably fixed with respect to the holder in the second lateral edge area via the one fastening dome and an associated threaded bolt engaging in the one fastening dome and the holder, and
  - the fasteners for fixing the sensor housing on the holder are each configured as ball clips fastened in the holder, each ball clip having a ball end fixedly received in a complementary socket section of a respective fastening dome.

2. The arrangement according to claim 1, wherein the fastening domes are rotatably fastened in the sensor housing.

3. The arrangement according to claim 1, wherein the ball ends form a pivot point for the sensor housing.

4. The arrangement according to 1, wherein the threaded bolt is configured as a spherically headed threaded bolt, the spherical head engaging in the fastening dome and being rotatably fixed in the fastening dome.

5. The arrangement according to claim 1, wherein a tilted position of the sensor housing is adjustable with respect to the holder via rotation of the threaded bolt.

6. The arrangement according to claim 1, further comprising an insert nut arranged on the holder, the threaded bolt being threaded into the insert nut.

7. The arrangement according to claim 1, wherein the fastening domes and the ball clips comprise slots.

8. The arrangement according to claim 1, wherein the ball clips are formed of a plastic material and are snapped into the holder.

9. The arrangement according to claim 8, wherein the fasteners are formed of a plastic material and are snapped into the receiving devices of the sensor housing.

* * * * *